United States Patent
Landau

(10) Patent No.: US 8,490,985 B2
(45) Date of Patent: *Jul. 23, 2013

(54) KICK SCOOTER

(76) Inventor: Sergio Landau, Laguna Niguel, CA (US)

(*) Notice: Subject to any disclaimer, the term of this patent is extended or adjusted under 35 U.S.C. 154(b) by 31 days.

This patent is subject to a terminal disclaimer.

(21) Appl. No.: 13/245,789

(22) Filed: Sep. 26, 2011

(65) Prior Publication Data

US 2012/0319373 A1 Dec. 20, 2012

Related U.S. Application Data

(60) Provisional application No. 61/498,312, filed on Jun. 17, 2011.

(51) Int. Cl.
*B62M 1/00* (2010.01)

(52) U.S. Cl.
USPC ............. 280/87.041; 280/87.05; 280/278; 280/287

(58) Field of Classification Search
USPC . 280/87.041, 87.04, 87.05, 278, 287; 403/13, 403/322.2, 318, 109.6, 378, 379.5, 11, 321, 403/325, 328, 375, 377
See application file for complete search history.

(56) References Cited

U.S. PATENT DOCUMENTS

| | | | | |
|---|---|---|---|---|
| 1,472,164 A | * | 10/1923 | Gilbert | 280/87.041 |
| 1,476,294 A | * | 12/1923 | Gilbert | 280/87.05 |
| 2,746,769 A | * | 5/1956 | Hoogendoorn | 280/287 |
| 5,221,111 A | * | 6/1993 | Younger | 280/809 |
| 6,173,976 B1 | * | 1/2001 | Lee | 280/87.05 |
| 6,305,698 B1 | * | 10/2001 | Liang | 280/87.041 |
| 6,786,669 B2 | * | 9/2004 | Tsui et al. | 403/322.2 |
| 6,923,459 B2 | * | 8/2005 | Yeo et al. | 280/87.041 |
| 7,192,038 B2 | * | 3/2007 | Tsai | 280/87.041 |
| 7,635,137 B2 | * | 12/2009 | Gregory et al. | 280/87.05 |
| 2002/0020980 A1 | * | 2/2002 | Lee | 280/87.041 |
| 2006/0076746 A1 | * | 4/2006 | Chang | 280/87.05 |
| 2006/0186641 A1 | * | 8/2006 | Chan | 280/638 |

* cited by examiner

*Primary Examiner* — J. Allen Shriver, II
*Assistant Examiner* — Steve Clemmons

(57) ABSTRACT

Embodiments herein provide a kick scooter comprising of 4 main assemblies: a center deck, a front wheel assembly, a rear wheel assembly, and a handle assembly, where these 4 assemblies have means to be easily and quickly separated from, and attached to, each other. The scooter allows the user to collapse the whole scooter into a compact volume so that it can be carried in a small backpack and be able to be reassembled for use in a few seconds and without any tools.

19 Claims, 9 Drawing Sheets

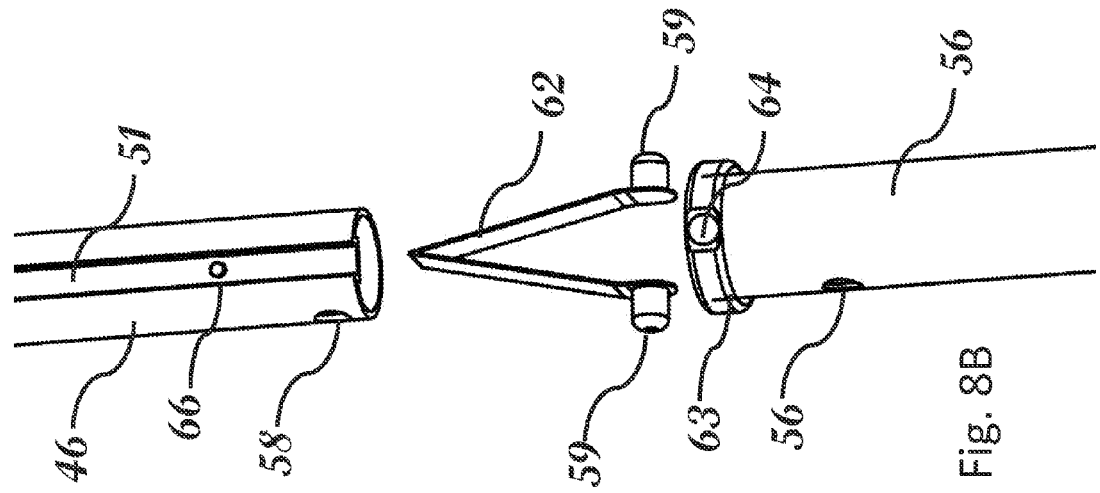
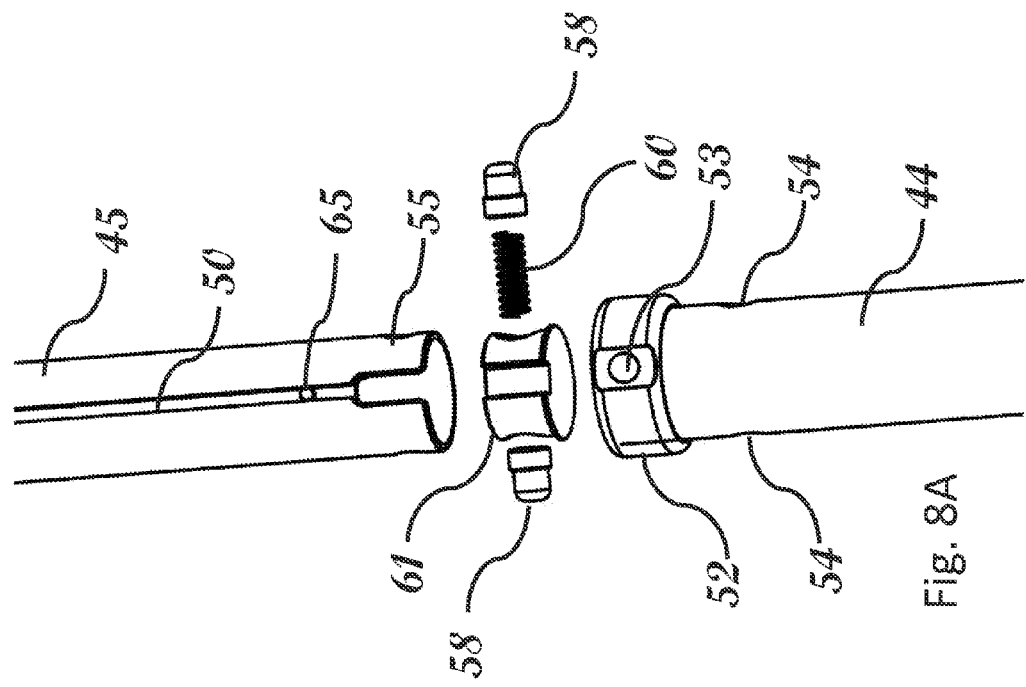
Fig. 8B
Fig. 8A

KICK SCOOTER

CROSS REFERENCE TO RELATED APPLICATION

The present application claims priority to U.S. Provisional Patent Application No. 61/498,312, filed Jun. 17, 2011 for "SCOOTER," the entire disclosure of which is hereby incorporated by reference in its entirety.

TECHNICAL FIELD

Embodiments herein relate to the field of scooters.

BACKGROUND

Two-wheeled kick scooters became very popular in the last few years, more as toys then as personal transportation devices. The kick scooters that have been on the market for decades follow the same basic design of a center deck or platform between 2 wheels where the rider stands on, and a handle post with a cross handle bar at the top; the post and the cross handle bar usually forming a T shape. Ordinarily in these designs, the T shaped handle folds at its base over the center deck and the 2 wheels to make the scooter more compact, allowing the user more convenience for carrying and storing. On some of these scooters designs, the handle grips can be pulled out from the handle post, so that the scooter when collapsed assumes a slimmer shape, usually as wide as the center deck itself. But these folding scooters cannot be shorter than the length of the center deck plus the length of the 2 structures that respectively hold the front and rear wheels. Even the smaller scooters designed for little children, when folded, will not fit in a small backpack (school backpack), and typically don't fit in a school locker either.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

FIG. 8A illustrates a partial close-up of the exploded view of FIG. 7, showing the components that couple a lower segment of the handle post to a middle segment of the handle post;

FIG. 8B illustrates a partial close-up of the exploded view of FIG. 7, showing the components that couple the middle segment of the handle post to an upper segment of the handle post.

DETAILED DESCRIPTION OF DISCLOSED EMBODIMENTS

Figure 1:
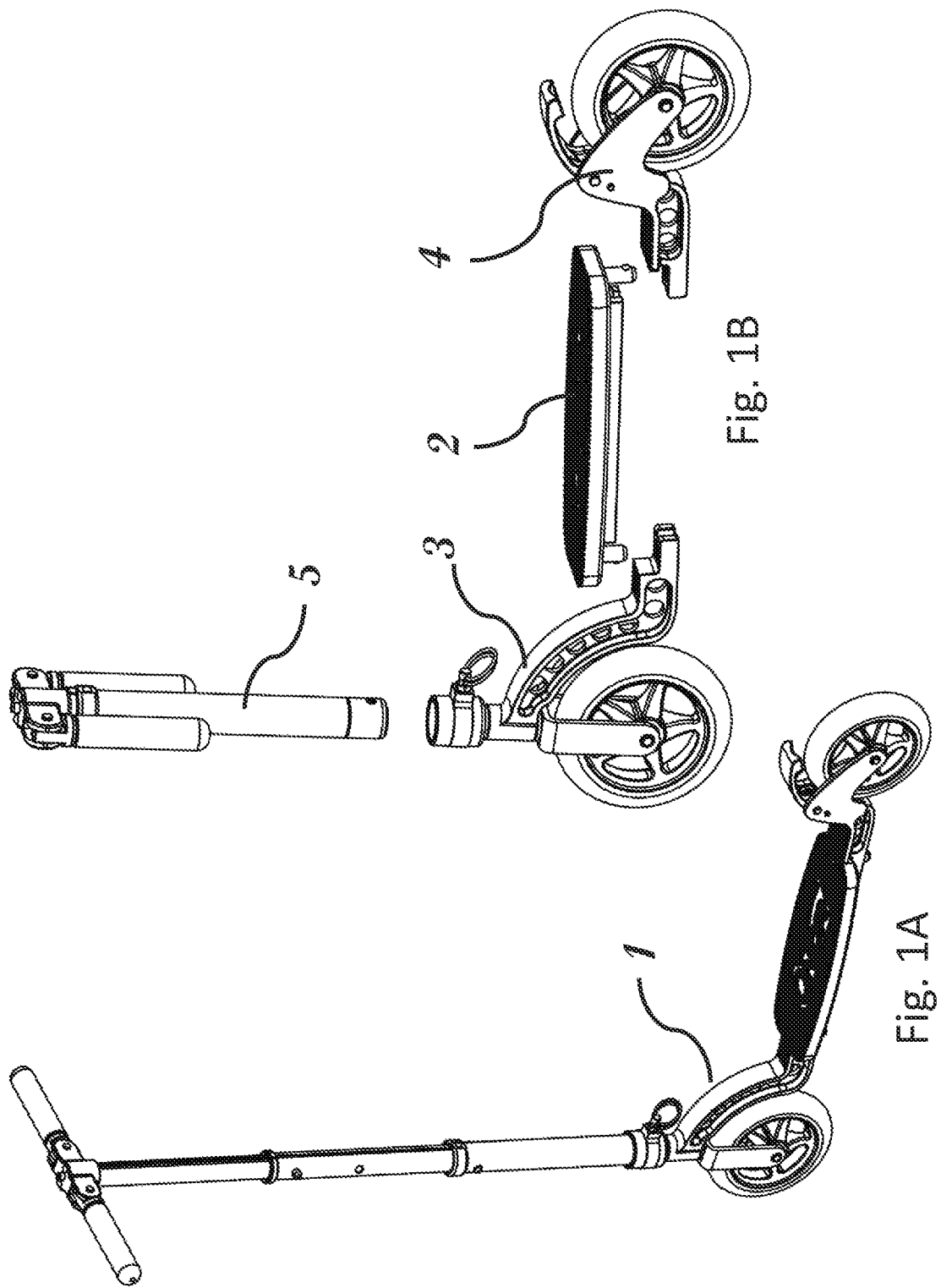
FIG. 1A illustrates a perspective view of a scooter in accordance with various embodiments.
FIG. 1B illustrates an exploded view of the scooter embodiment of FIG. 1A, showing a deck, a front wheel assembly, a rear wheel assembly, and a handle assembly separated from one another.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Various embodiments provide a kick scooter comprising 4 main assemblies: a center deck, a front wheel assembly, a rear wheel assembly, and a handle assembly, where these 4 assemblies have means to be easily and quickly separated from, and attached to, each other. The design allows the user to collapse the whole scooter into a compact volume so that it can be carried in a small backpack and be able to be reassembled for use in a few seconds and without any tools.

The present disclosure provides a method and apparatus where the center deck can be quickly and easily separated from the front and the rear wheel assemblies, and the handle post which collapses in 3 or more segments, can be quickly separated from the front wheel assembly, thus allowing the scooter to be taken apart in 4 main pieces, each of them less than 12 inches in length, regardless whether the scooter is designed to be used by children or adults. This quick separation of the center deck from the wheels, and the handle post from the front wheel assembly is what makes the product unique from all other scooter designs and very practical for use, as it can be carried and stored in a small backpack, handbag, or small locker. The central deck is attached to each of the wheels assemblies by means of one locking pin or other quick locking/release elements that can be easily engaged and disengaged by hand without the use of tools. The handle assembly is comprised of in 3 or more tubular segments and it is attached to the top of the front wheel assembly by means of a locking plunger biased by a spring in the default locking position. To attach or remove the handle assembly from the wheel assembly, the user just pulls the plunger out and let the handle post slip into or out from the wheel structure. Upon release of the locking plunge, the handle assembly will be automatically locked in place for safe use of the scooter.

The drawings enclosed illustrate the preferred embodiment for the present invention.

FIG. 1A shows the scooter 1 fully assembled and ready to use. FIG. 1B shows the scooter with the 4 main sub-assemblies separated from each other. The center deck 2 connects in the front to the front wheel assembly 3, and in the rear to the rear wheel assembly 4. The bottom end of the handle assembly 5 (shown in the collapsed position in FIG. 1B) connects to the top end of the front wheel assembly 3. Once the four sub-assemblies are connected to each other, and the handle assembly 5 is pulled up, the scooter 1 will be the integral unit shown on FIG. 1A. The connections between the four sub-assemblies shown on FIG. 1B are designed in such a way that they will not come undone by accident or during the normal use of the scooter as explained below.

Figure 2:
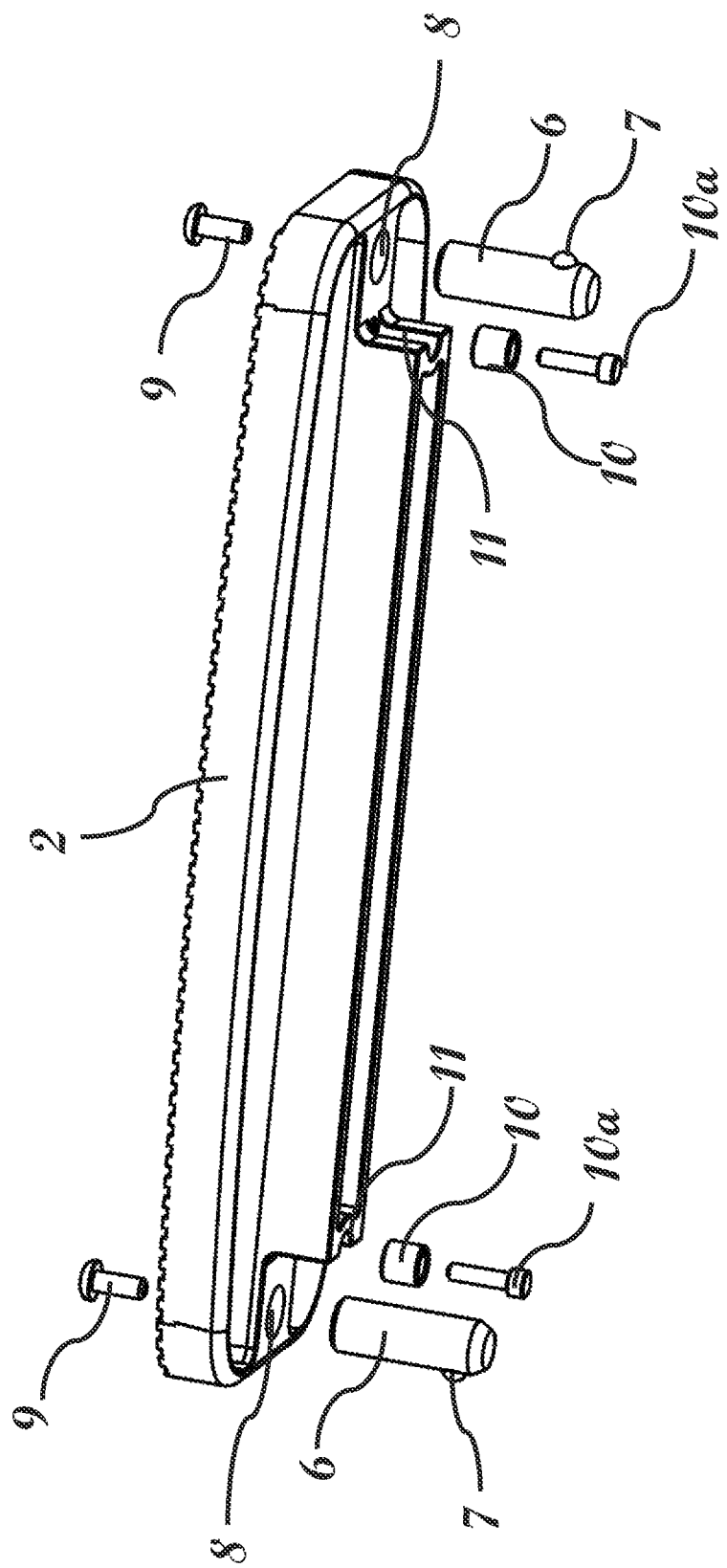
FIG. 2 illustrates an exploded view of the deck of the embodiment of FIG. 1A.

FIG. 2 shows an exploded view of the center deck 2. The center deck 2 is a long flat part designed to accommodate the bottom of the foot of the scooter rider. The center deck 2 is symmetrical on both ends to facilitate assembly; meaning that the front end is identical to the rear end, so that either of the ends of the center deck 2 can be connected to either the front wheel assembly 3 or to the rear wheel assembly 4. At each end of the center deck 2 there is a locking pin 6 that has at its lower end a locking ball 7 that is biased in the outward position (shown on FIG. 2) by a spring inside the locking pin (not shown). The top end of the locking pin 6 is secured in position into the blind hole 8 at the end of the center deck 2 by means of a bolt 9 that is inserted from the top surface of the center deck and screwed into the top surface of the locking pin 6. This way, the 2 locking pins become integral parts of the center deck 2, as shown on FIG. 1B.

FIG. 2 also shows 2 round guide bushings 10 that are lodged at the bottom of the center deck 2, right next to the locking pins 6. These guide bushings 10 are secured to the center deck 2 by means of a bolt 10a that are screwed to the bottom of the center deck 2, through the guide bushings 10. The purpose of the guide bushings 10 is to maintain the front wheel assembly 3 and the rear wheel assembly 4 always aligned with the center deck 2.

Figure 3:
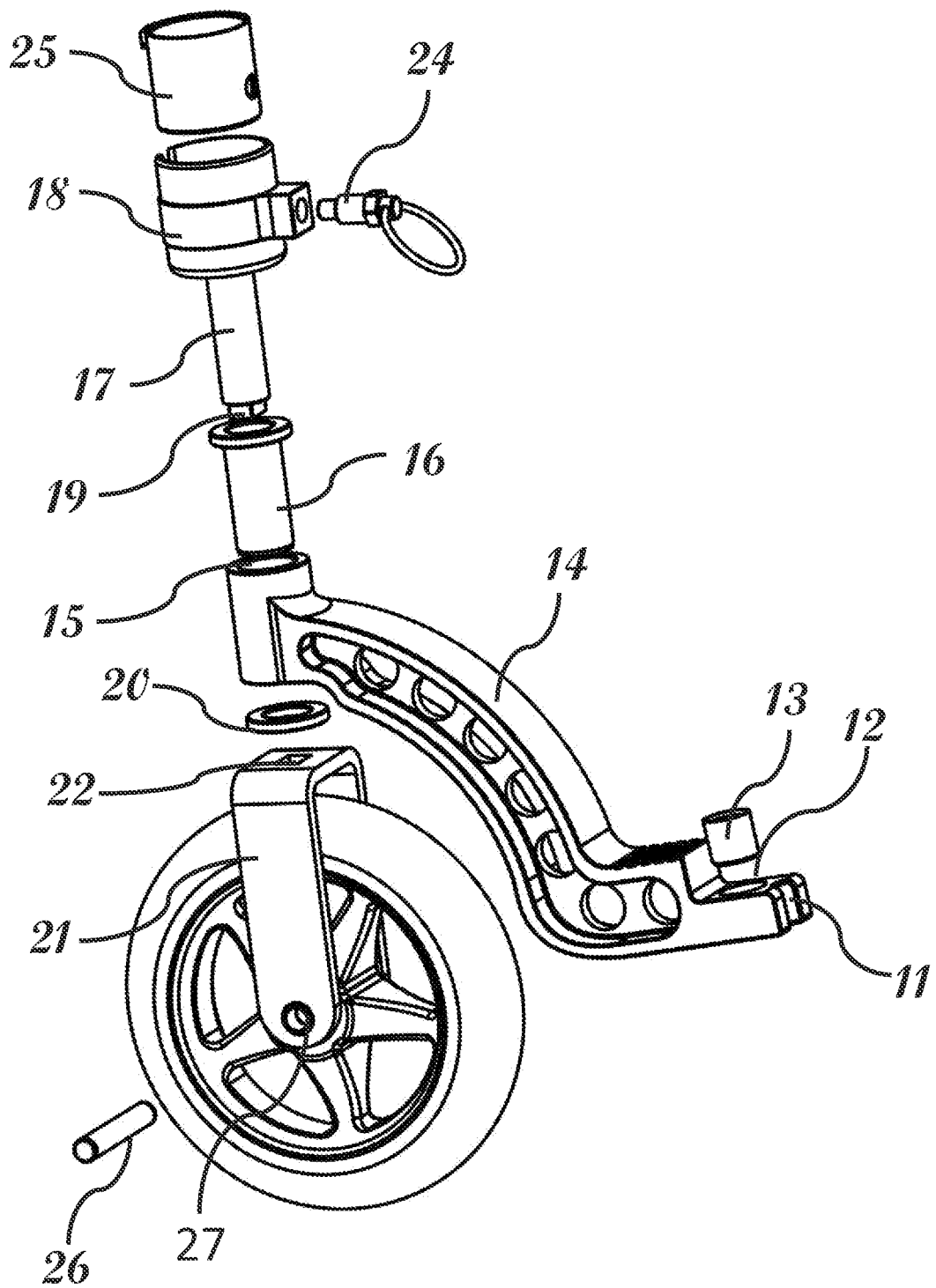
FIG. 3 illustrates an exploded view of the front wheel assembly of the embodiment of FIG. 1A.

FIG. 3 shows an exploded view of the front wheel assembly 3. As shown on FIG. 3, the locking pin hole 12 has a metal sleeve 13 that is pressed fit into the locking pin hole 12. The purpose of the metal sleeve 13 is to prevent wear on the inner surface of the hole 12 as the locking pin 6 with spring ball 7 can be inserted and removed from the hole 12 thousands of times during the lifespan of the scooter 1. This will happen each time the front wheel assembly 3 and the rear wheel assembly 4 are attached to or detached from the center deck 2. Since the center deck 2 is symmetrical on both ends, the hole 12 and metal sleeve 13 are identical on the front wheel assembly 3 and rear wheel assembly 4 (as shown in FIG. 4).

FIG. 3 also shows how the components on the front wheel assembly 3 go together. The front wheel structure 14 at the rear bottom end carries the locking pin hole 12 with the pressed fit metal sleeve 13. At the front top end, the structure 14 has a through hole 15, where a bearing bushing 16 is inserted. The bearing bushing 16 receives the shaft 17 of the steering base 18. At the bottom of the shaft 17, there is a protrusion 19, typically a square or rectangular shape, that will orientate the front fork 21, as it connects to a recess 22 on the top of the front fork 21; this recess 22 having the same shape of the protrusion 19. This way the steering base 18 cannot rotate in relation to the front fork 21. It can only rotate in relation to the front wheel structure 14 which is connected and aligned to the center deck 2. The front wheel structure 14 rests on the top of the front fork 21. Since these 2 parts rotate in relation to each other, there is a bearing washer 20 in between these 2 parts; this bearing washer 20 made of low friction material.

Figure 6B:
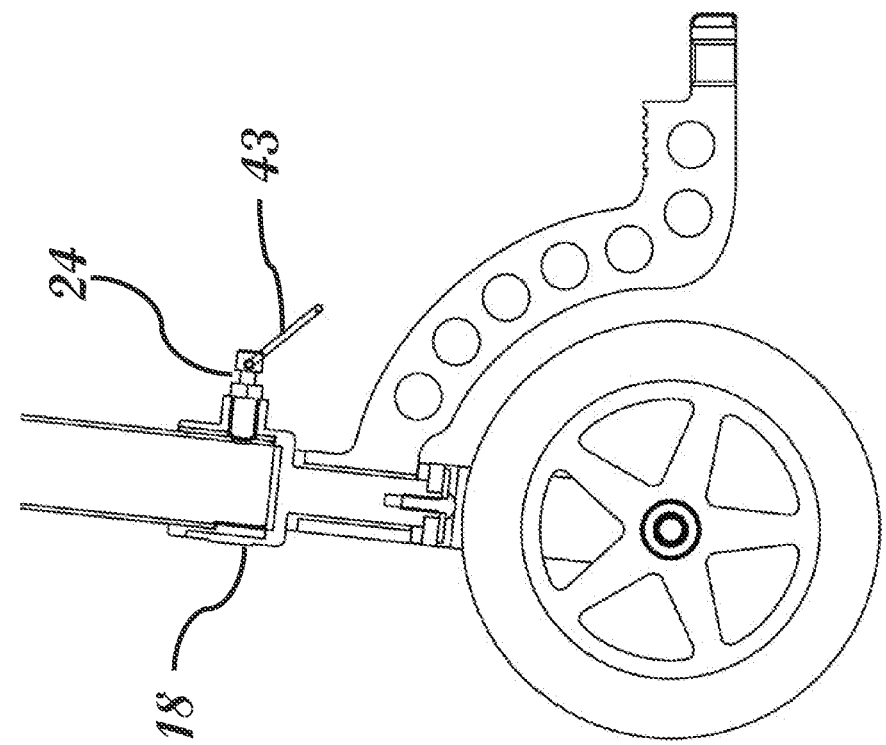
FIG. 6B illustrates a partial side view of the front wheel assembly and handle assembly of the embodiment of FIG. 1A, showing the plunger of the front wheel assembly in a retracted position to release the handle post from the front wheel assembly.
Figure 6A:
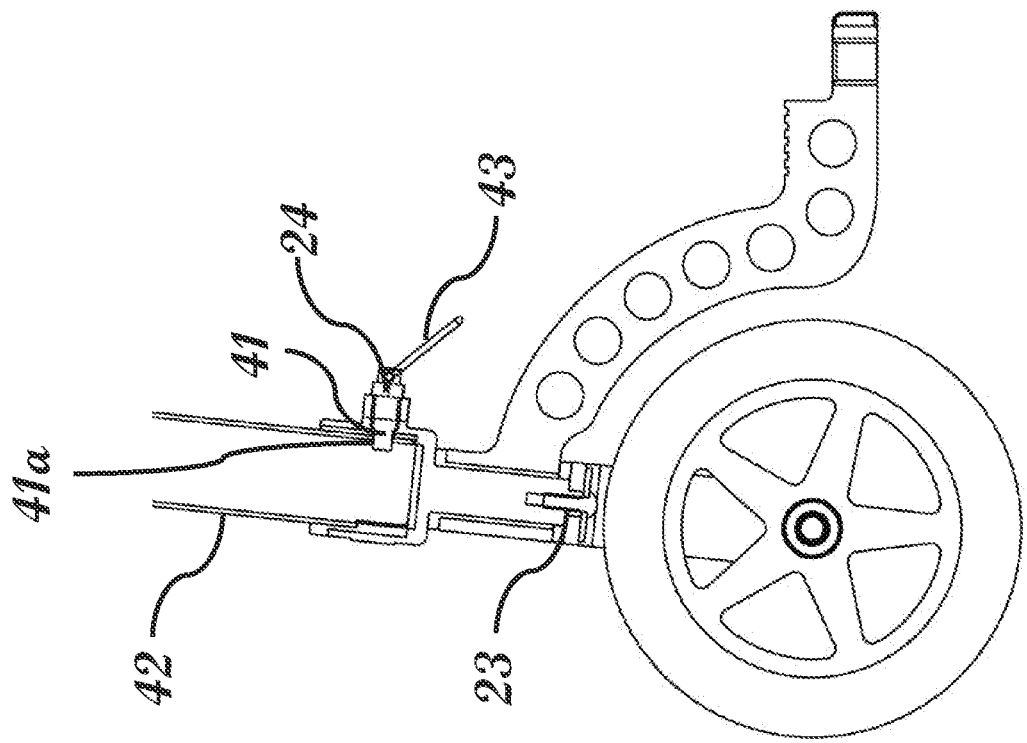
FIG. 6A illustrates a partial side view of the front wheel assembly and handle assembly of the embodiment of FIG. 1A, showing a plunger of the front wheel assembly in an extended position to releasably secure the handle post to the front wheel assembly.

The steering base 18 is permanently attached to the front fork 21 by means of a bolt 23 shown on FIG. 6A. FIG. 3 also shows the handle locking plunger 24 and the handle receiver sleeve 25. The purpose of these parts will be explained later as we describe the handle assembly 5 and its attachment to the front wheel assembly 3. The round pin 26 goes through the bottom holes 27 of the front fork 21 and functions as the front wheel shaft which is secured in place on both ends by retaining rings (not shown).

Figure 4:
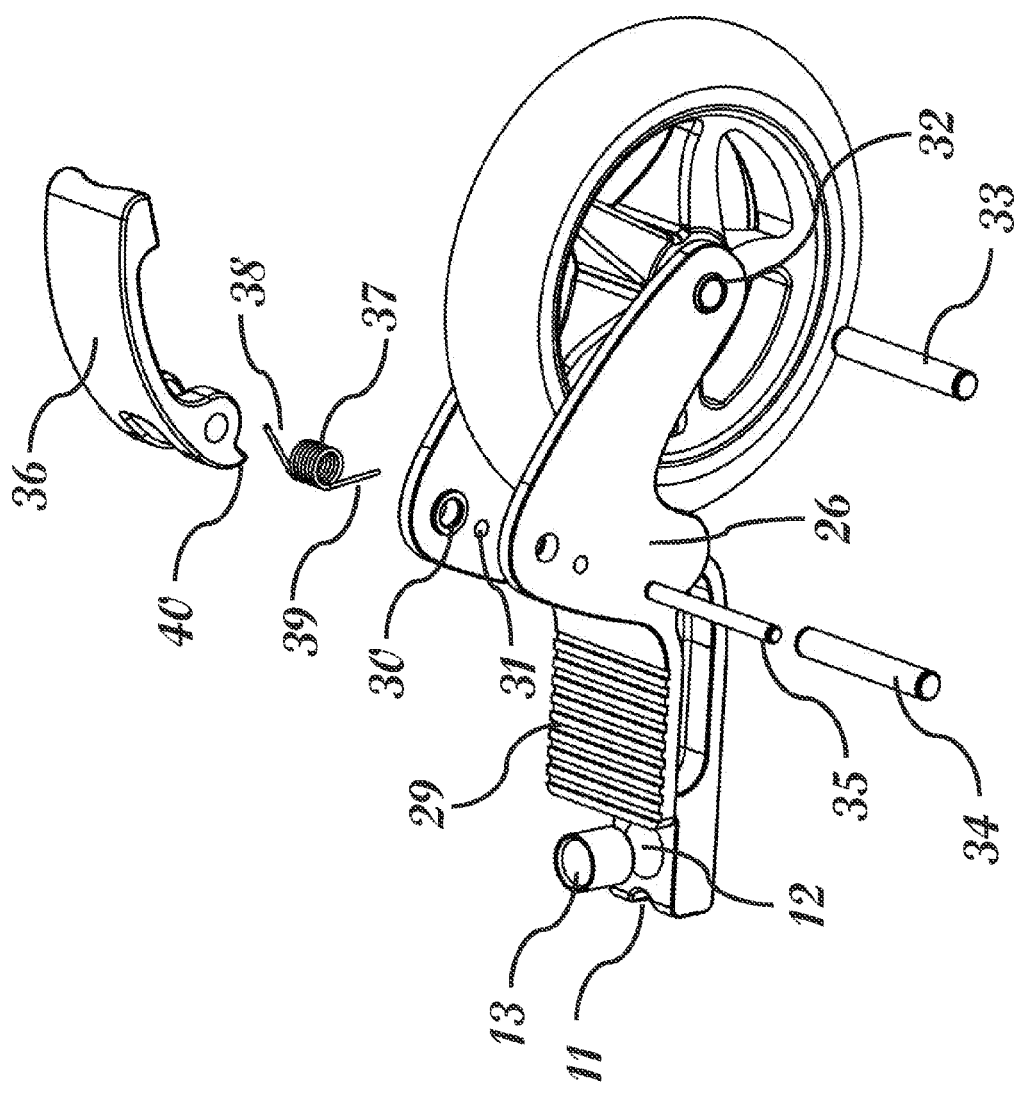
FIG. 4 illustrates an exploded view of the rear wheel assembly of the embodiment of FIG. 1A.

FIG. 4 is an exploded view of the rear wheel assembly 4. The rear wheel assembly 4 comprises of a main rear wheel structure 28, that has on its front end the guiding bushing recess 11, the locking pin hole 12, and the metal sleeve 13; all of these elements and feature identical to the ones found on the front wheel structure 14. On the top of the rear wheel structure there is a flat surface 29 that abuts and levels against the rear side of the center deck 2, thus it can be used as an extension surface for the second foot of the rider, which is usually the foot that the rider will use for braking the scooter. The rear wheel structure 28 has three crossed through holes respectively 30, 31, 32, that go from one side to the other of the part. The holes 30, 31, and 32 are for the brake spring stopper 35, the brake shaft 34, and the rear wheel shaft 33, respectively. The brake 36 pivots around the brake shaft 34 and it is biased by a torsion spring 37. The torsion spring 37 coils around the brake shaft 34 and has one of its arms 38 rested against the brake spring stopper 35, the other arm 39 rested against the bottom of the brake 36, pushing the brake 36 upwards and away from the rear wheel. What limits the brake 36 to move upwards too far from the rear wheel is the extended protrusion 40 that hits the brake shaft 34 at a certain pre-determined angle maintaining the brake 36 in a default position that is easy for the rider to step on and safely stop the scooter from moving.

Figure 5:
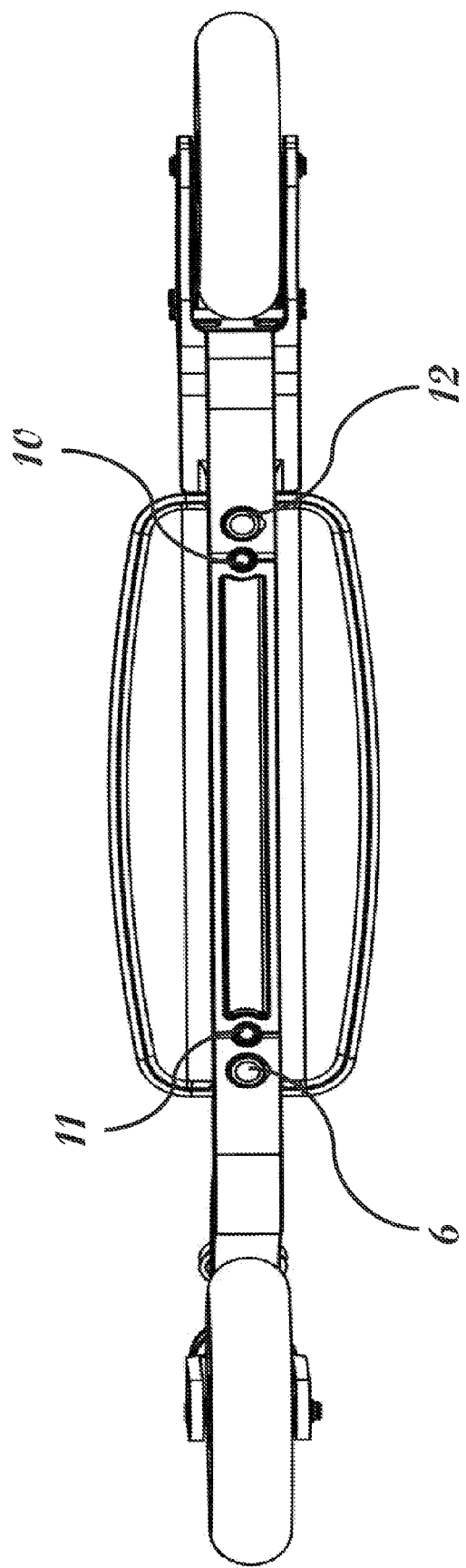
FIG. 5 illustrates a bottom view of the scooter of FIG. 1A.

FIG. 5 is an elevation view of the bottom or the scooter 1. As shown on FIG. 5, each round recess 11 at the end of each wheel assembly (3 and 4), when connected to the center deck 2, wraps around each guide bushing 10, preventing the wheel assemblies 3 and 4 to rotate around the locking pins 6, thus maintaining the wheel assemblies 3 and 4 always aligned to the center deck 2. FIG. 5 also shows the locking pins 6 engaged through the holes 12 at the end of each wheel assembly 3 and 4.

FIGS. 6A and 6B show cross sections of the front wheel assembly with the handle locking plunger 24 in 2 different positions. FIG. 6A shows the locking plunger 24 in the default locking position with the tip of the plunger 41 extended outwards, penetrating in the cross hole 41a on the base of the handle post 42.

FIG. 6B shows the locking plunger 24 pulled out, in the retracted position, allowing the handle post 40 to be inserted or removed from the steering base 18. There is an internal spring in the plunger (not shown) that will keep the plunger always extended outwards on its default locking position. When the user wants to remove the handle post 42 from the front wheel assembly 3, he/she will pull out the ring 43, retracting the plunger inside its case and out of the cross hole 41A on the bottom of the handle post 42, so that it becomes free to be pulled out of the steering base 18.

Figure 7:
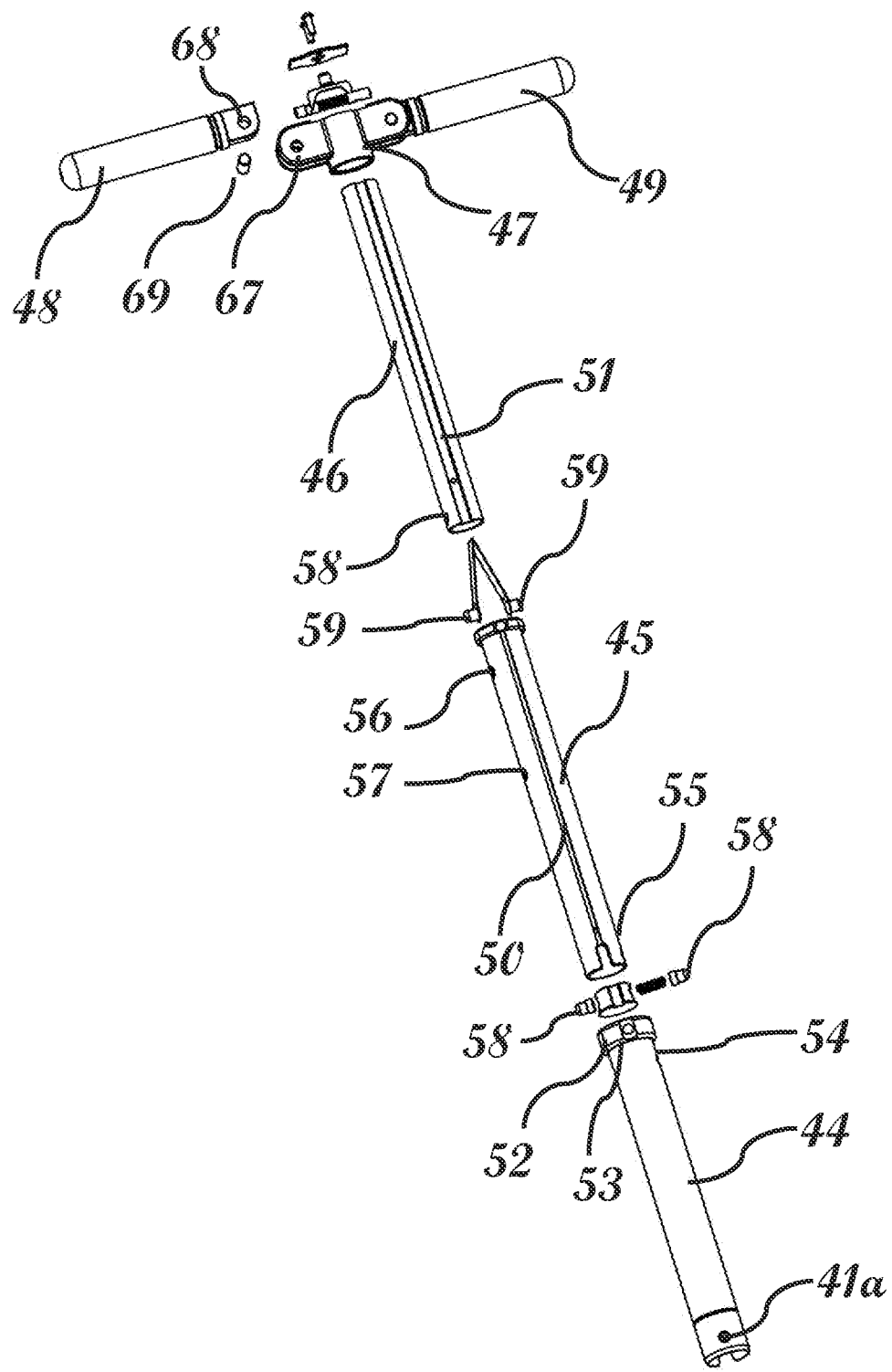
FIG. 7 illustrates an exploded view of the handle assembly of the embodiment of FIG. 1A.

FIG. 7 is an exploded view of the whole handle assembly. It shows the three main vertical tubular segments that form the handle post, respectively, the bottom handle post 44, the middle handle post 45, and the top handle post 46. The top handle post 46 on its upper end connects to the handle head 47. The handle head 47 has on its left end the left handle grip 48, and on its right end the right handle grip 49, which is identical to the left handle grip 48. The top handle post 46 slides inside the middle post 45, which slides inside the bottom post 44, so that when the handle assembly 5 is in the collapsed position, as shown on FIG. 1A, the bottom handle post 44 is outside, the middle handle post 45 is in the middle, and the top handle post 46 is inside. The three segments of the handle post must slide longitudinal, but they cannot rotate in relation to one another, otherwise the handle grips 49 and 49 would not be able to steer the front wheel. In order to accomplish this, the middle handle 45 has a longitudinal groove 50, and the top handle 46 has also a longitudinal groove 51. The groove 50 rides on and inside the groove 51, thus preventing the top handle post 46 to rotate in relation to the middle handle post 45. The bottom handle post 44 does not have a longitudinal groove, but it has a collar 52 with a pin 53. As the middle handle post 45 slides up and down inside the bottom handle post 44, the tip of the pin 53 rides inside the groove 50, thus preventing the middle handle post 45 and the bottom handle post 44 to rotate between each other. This way, the 3 handle posts are always oriented among themselves, transferring any rotation on the handle grips 48 and 49 straight down to the steering base 18 and front fork 21, which guides the direction that the front wheel goes.

FIG. 7 also shows the cross hole 41A where the locking plunger 24 penetrates to secure the handle assembly 5 to the steering base 18. Also on FIG. 7, we see the cross holes 54 on the bottom handle post 44, cross holes 55, 56, and 57 on the middle handle post 45, and cross hole 58 on the top handle post 46. These are the cross holes that the locking pins 58 and 59 ride on and snap in so that the 3 segments bottom, middles and top posts, respectively 44, 45, and 46, can be locked in the extended position. When hole 54 is locked and aligned to hole 55 by locking pins 58, and hole 56 is locked and aligned to hole 58 by locking pins 59, the handle post is fully extended at its longest length, ready to be used by taller riders. The handle assembly is shown on this position on FIG. 1A. When the hole 57 is locked and aligned to hole 58 by locking pins 59, the handle post will be extended at its shorter length, ready to be used by shorter riders. The middle handle post 45 may have as many cross holes as necessary allowing the handle post to be adjusted in a variety of heights.

FIGS. 8A and 8B show exploded views of the details of the locking mechanism among the three handle posts 44, 45, and 46, same as shown on the overall exploded view of the handle assembly on FIG. 7. On FIG. 8A, the locking pins 58 are lodged inside the cylindrical body 61 with a compression spring 60 in the middle, pushing the 2 locking pins 58 out and away from each other. This whole assembly (body 61, spring 60 and locking pins 58) is permanently lodged at the bottom end of the middle handle post 45, so that pins 58 are trapped in holes 55, biased by spring 60 to be in the default outward position. As the middle handle post 45 slide inside the bottom handle post 44, the locking pins 58 fall inside holes 54, thus locking middle handle post 45 to bottom handle post 44. If the scooter user wants to collapse the handle assembly, he/she will press in the locking pins 58 to allow the middle handle post 45 to slide in the bottom handle post 44. The middle handle post 45 cannot be pulled completely out from the bottom handle post 44 because of the pin stopper 65 on the bottom edge of the groove 50. The pin 53 that rides inside the groove 50 will hit the pin stopper 65 if the user tries to pull completely out the middle handle post 45 from the bottom handle post 44.

Similar function is shown on FIG. 8B which details locking mechanism between the middle handle post 45 and top handle post 46. On FIG. 8B, the locking pins 59 are connected by a flexible "V" shaped arm made of spring material 62, pushing the two locking pins 59 out and away from each other. These pins 59 with spring arm 62 are permanently lodged at the bottom end of the top handle post 46, so that pins 59 are trapped in holes 58, biased by the spring arm 62 to be in the default outward position. As the top handle post 46 slide inside the middle handle post 45, the locking pins 59 fall inside holes 56, thus locking top handle post 46 to middle handle post 45. If the scooter user wants to fully collapse the handle assembly, he/she will also press in the locking pins 59 to allow the top handle post 46 to slide in the middle handle post 45. The top handle post 46 cannot be pulled completely out from the middle handle post 45 because of the pin stopper 66 on the bottom edge of the groove 51. The pin 63, held at the top of the middle handle post by the collar 64, rides inside the groove 51, and will hit the pin stopper 66 if the user tries to pull completely out the top handle post 46 from the middle handle post 45. This way, the handle assembly cannot be pulled out further than its fully extended position.

Figure 9:
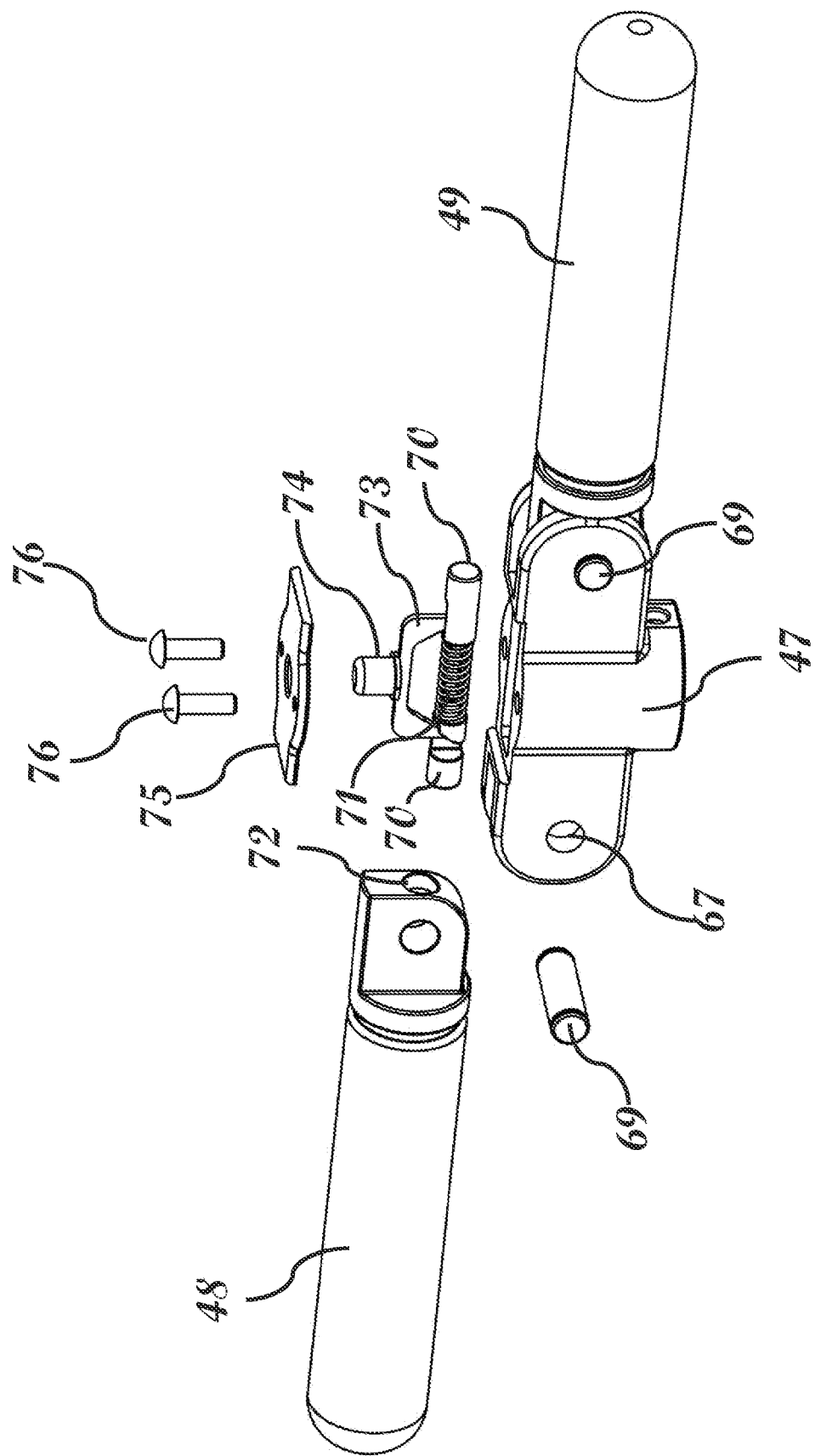
FIG. 9 illustrates a partially exploded view of the handle head and grip portions of the handle assembly, showing the left grip portion in an exploded view and the right grip portion in an assembled view.

FIG. 9 shows detail exploded view of the top of the handle post and the unique mechanism to extend and collapse the handle grips. The handle head 47 is permanently attached to the top handle post 46 by means of welding or mechanical bolts (not shown). The handle head 47 has on each side a cross through hole 67. The handle grips 48 and 49 have a side hole 68 that is aligned to the cross through holes 67 by a pin 69 on either side of the handle head 47. On the left side the handle head 47, the handle grip 48 and the pin 69 are shown in an exploded view. On the right side, the handle grip 49 is shown assembled on the handle head 47. Inside the handle head 47 there are two identical pins 70 that run in the center of the handle head 47 in its longitudinal axis. The two pins 70 are biased by a compression spring 71 that forces the pins 70 outwards, against the inner end of either handle grips 48 and 49. On the inner face of the handle grips 48 and 49 there is a blind hole 72 which has a slightly larger diameter than the pins 70, so that the spring 71 pushes the two pins 70 inside the blind hole 72 on either handle grips, therefore locking the handle grips 48 and 49 in the open/extended position shown on the right side of FIG. 10. The blade 73 is permanently attached to handle grip release button 74, and whole locking-release assembly (70, 71, 73, and 74) is contained inside the handle head 47 by a cover 75 bolted to the handle head 47 by two bolts 76. The release button 74 protrudes out through the cover 75. When the rider presses down the release button 74, the two inclined tips 76 of the blade 73 ride on the equally inclined grooves 77 of the pins 70, forcing the pins 70 to move inwards against the spring 71. As the two pins 70 move inwards, they come out of the hole 72 on either grip handles, therefore releasing the handles to be folded in to a storage position, parallel to the handle post, as shown on FIG. 1A.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A kick scooter, comprising:
   a first wheel assembly having a first body and a first wheel;
   a second wheel assembly having a second body and a second wheel;
   a deck having an upper surface configured to support a user, the deck having first and second end portions;
   a handle assembly coupled to the first wheel assembly and configured to be grasped by the user while operating the kick scooter;
   a first receiving hole on either the first body of the first wheel assembly or the first end portion of the deck;
   a second receiving hole on either the second body of the second wheel assembly or the second end portion of the deck;
   a first locking member extending from either the first end portion of the deck or the first body of the first wheel assembly and configured to engage with the first receiving hole to releasably secure the first wheel assembly to the deck so that the first wheel assembly may be uncoupled from the deck by disengaging the first locking member from the first receiving hole;
   a second locking member extending from either the second end portion of the deck or the second body of the second wheel assembly and configured to engage with the second receiving hole to releasably secure the second wheel assembly to the deck so that the second wheel assembly may be uncoupled from the deck by disengaging the second locking member from the second receiving hole;
   wherein the first body of the first wheel assembly includes a first recess, and the second body of the second wheel assembly includes a second recess;
   a first guide bushing coupled to the first end portion of the deck adjacent the first locking member and configured to interact with the first recess of the first wheel assembly to maintain alignment of the first wheel assembly with the deck; and
   a second guide bushing coupled to the second end portion of the deck adjacent the second locking member and configured to interact with the second recess of the second wheel assembly to maintain alignment of the second wheel assembly with the deck.

2. The kick scooter of claim 1, wherein the first locking member and second locking member each includes a pin and a plunger coupled to the pin, the plunger biased in an extended position, in which the plunger extends radially from the pin, to engage the locking member with the receiving hole, and the plunger configured to be selectively retracted to disengage the locking member from the receiving hole.

3. The kick scooter of claim 1, wherein the first end portion of the deck and the first locking member are substantially identical to the second end portion of the deck and the second locking member, respectively, so that the first wheel assembly may be coupled to either the first end portion or the second end portion of the deck, and the second wheel assembly may be coupled to either the first end portion or the second end portion of the deck.

4. The kick scooter of claim 1, wherein at least one of the first wheel assembly and second wheel assembly include a secondary support surface that is substantially aligned with the upper surface of the deck and configured to support a foot of the user.

5. The kick scooter of claim 1, wherein no linear dimension of the first wheel assembly, the second wheel assembly, or the deck exceeds twelve inches.

6. The kick scooter of claim 1, wherein the handle assembly is configured to be releasably coupled to the first wheel assembly, the handle assembly including a post that extends upward when the kick scooter is assembled and one or more grip portions coupled to the post, the grip portions configured to be grasped by the user while standing on the deck;
   wherein the handle post includes three or more telescoping segments, including a first segment, a second segment, and a third segment, the post being adjustable between a retracted position, in which the first segment is substantially disposed within the second segment and the second segment is substantially disposed within the third segment, and an extended position in which the first segment substantially extends from the second segment and the second segment substantially extends from the third segment.

7. A kick scooter, comprising:
   a deck having an upper surface configured to support a user, and the deck including first and second end portions;
   a front wheel assembly coupled to the first end portion of the deck and including a first body and a handle base;
   a rear wheel assembly coupled to the second end portion of the deck and including a second body;
   wherein the first body of the front wheel assembly includes a first recess, and the second body of the rear wheel assembly includes a second recess;
   a first guide bushing coupled to the first end portion of the deck adjacent the first locking member and configured to interact with the first recess of the front wheel assembly to maintain alignment of the front wheel assembly with the deck;
   a second guide bushing coupled to the second end portion of the deck adjacent the second locking member and configured to interact with the second recess of the rear wheel assembly to maintain alignment of the rear wheel assembly with the deck; and a handle assembly releasably coupled to the handle base of the front wheel assembly, the handle assembly including a post extending upward from the handle base and first and second grip portions coupled to a top end portion of the post and configured to be grasped by the user while operating the scooter, the post including three or more telescoping segments, including a first segment, a second segment, and a third segment, the post being adjustable between a compressed position, in which the first segment is substantially disposed within the second segment and the second segment is substantially disposed within the third segment, and an extended position in which the first segment substantially extends from the second segment and the second segment substantially extends from the third segment.

8. The scooter of claim 7, wherein a bottom end portion of the post includes a hole, and wherein the handle base includes a plunger biased in an extended position to extend through the hole in the bottom end portion of the post to releasably secure the post to the front wheel assembly, the plunger being retractable by the user to allow the post to be uncoupled from the front wheel assembly.

9. The scooter of claim 7, wherein the post is releasably secured in the extended position by one or more spring-loaded pins coupled to a lower end of the first segment that extend through one or more holes at an upper end of the second segment, and one or more spring-loaded pins coupled to a lower end of the second segment that extend through one or more holes at an upper end of the third segment.

10. The scooter of claim 9, wherein the second segment further includes one or more holes in a middle portion of the second segment configured to receive the one or more spring-loaded pins of the first segment to allow the post to be releasably secured in an intermediate position in which a length of the post is shorter than the length of the post in the extended position and longer than the length of the post in the compressed position.

11. The scooter of claim 7, wherein the front wheel assembly includes a front wheel, and wherein the handle assembly is operatively coupled to the front wheel when the handle assembly is coupled to the front wheel assembly, so that rotating the handle assembly causes rotation of the front wheel, and wherein the first segment includes a first longitudinal groove that engages with a second longitudinal groove of the second segment to prevent rotation of the first segment with respect to the second segment.

12. The scooter of claim 11, wherein the third segment includes a guide pin that engages with the second longitudinal groove of the second segment to prevent rotation of the second segment with respect to the third segment.

13. The scooter of claim 7, wherein the grip portions of the handle assembly include first and second grip portions coupled to a handle head on the top end portion of the post and configured to rotate between an operating position, in which the grip portions are substantially perpendicular to a longitudinal axis of the post, and a storage position, in which the grip portions are oriented substantially parallel to the longitudinal axis of the post, and the handle head including:

a compression spring having a first pin coupled to a first end of the spring and a second pin coupled to a second end of the spring, the first pin configured to extend through a hole in the first grip portion to releasably secure the first grip portion in the operating position, and the second pin configured to extend through a hole in the second grip portion to releasably secure the second grip portion in the operating position; and a release member having slanted surfaces that, when the release member is depressed, push on slanted surfaces of the first pin and second pin to retract the first pin and the second pin from the respective holes in the first grip portion and second grip portion, thereby allowing the first and second grip portions to rotate to the storage position.

14. The scooter of claim 7, further comprising:

a first receiving hole in the front wheel assembly; a second receiving hole in the rear wheel assembly;

a first locking pin extending from the first end portion of the deck and configured to engage with the first receiving hole to releasably couple the front wheel assembly to the deck; and a second locking pin extending from the second end portion of the deck and configured to engage with the second receiving hole to releasably couple the rear wheel assembly to the deck.

15. The scooter of claim 14, wherein no linear dimension of the front wheel assembly, rear wheel assembly, or deck exceeds twelve inches, and wherein a length of the handle assembly does not exceed twelve inches when the post is in the retracted position.

16. A kick scooter, comprising:

a deck having an upper surface configured to support a user and having first and second end portions;

a front wheel assembly coupled to the first end portion of the deck and having a first body and a front wheel;

a rear wheel assembly coupled to the second end portion of the deck and having a second body and a rear wheel;

wherein the first body of the front wheel assembly includes a first recess, and the second body of the rear wheel assembly includes a second recess;

a first guide bushing coupled to the first end portion of the deck adjacent the first locking member and configured to interact with the first recess of the front wheel assembly to maintain alignment of the front wheel assembly with the deck;

a second guide bushing coupled to the second end portion of the deck adjacent the second locking member and configured to interact with the second recess of the rear wheel assembly to maintain alignment of the rear wheel assembly with the deck;

a handle assembly coupled to the front wheel assembly, the handle assembly having a post extending from the front wheel assembly, a handle head at a top end of the post, and first and second grip portions coupled to the handle head, the first and second grip portions each having a hole and configured to rotate between an operating position, in which the first and second grip portions are oriented substantially horizontally when the kick scooter is upright, and a storage position, in which the first and second grip portions are oriented substantially vertically when the kick scooter is upright, and the handle head including:

a compression spring having first and second ends;

a first pin coupled to the first end of the spring and having a first notch with a first slanted surface, the first pin configured to extend through the hole in the first grip portion to releasably secure the first grip portion in the operating position, a second pin coupled to the second end of the spring and having a second notch with a second slanted surface, the second pin configured to extend through a hole in the second grip portion to releasably secure the second grip portion in the operating position; and a release member having third and fourth slanted surfaces that, when the release member is depressed, push on the first and second slanted surfaces of the first pin and second pin, respectively, to retract the first pin and the second pin from the respective holes in the first grip portion and second grip portion, thereby allowing the first and second grip portions to rotate to the storage position.

17. The kick scooter of claim 16, wherein the handle head includes a housing, and the release member and compression spring are disposed within the housing, and the handle assembly further comprising a button coupled to the release member and extending from the housing, the button configured to depress the release member when the button is depressed.

18. The kick scooter of claim 16, wherein the handle post includes a top segment, a middle segment, and a bottom segment, the post being adjustable between a compressed position, in which the top segment is substantially disposed within the middle segment and the middle segment is substantially disposed within the bottom segment, and an extended position in which the top segment substantially extends from the middle segment and the middle segment substantially extends from the bottom segment.

19. The kick scooter of claim 16, wherein the handle assembly is configured to be releasably coupled to the front wheel assembly.

* * * * *